United States Patent [19]

Okamura et al.

[11] Patent Number: 4,773,143
[45] Date of Patent: Sep. 27, 1988

[54] LIQUID SUPPLY ROLLER AND METHOD OF MAKING SAME

[75] Inventors: Yuichi Okamura, Tokyo; Masayoshi Sato, Kawasaki, both of Japan

[73] Assignee: Kabushiki Kaisha Tokyo Kikai Seisakusho, Tokyo, Japan

[21] Appl. No.: 921,342

[22] Filed: Oct. 20, 1986

[30] Foreign Application Priority Data

Mar. 26, 1986 [JP] Japan .................................. 61-68084

[51] Int. Cl.⁴ ............................................. B21B 27/00
[52] U.S. Cl. ........................................ 29/127; 29/128; 29/148.4 D; 29/527.6
[58] Field of Search ...................... 29/128, 127, 121.1, 29/121.4, 148.4 D, 148.4 R, 527.4, 527.6; 101/348, 349

[56] References Cited

U.S. PATENT DOCUMENTS

| | | | |
|---|---|---|---|
| 3,974,554 | 8/1976 | Fantuzzo | 29/121.4 |
| 4,192,050 | 3/1980 | Appenceller | 29/121.4 |
| 4,270,254 | 6/1981 | Berglöff et al. | 29/127 |
| 4,363,163 | 12/1982 | McMaster | 29/127 |
| 4,611,902 | 9/1986 | Schön | 29/128 |

OTHER PUBLICATIONS

"New Principle and Practice of Flexographic Press" translated by Japanese Flexographic Technology Association, issued on Mar. 28, 1985, pp. 41 to 45.

Primary Examiner—Mark Rosenbaum
Assistant Examiner—Irene Cuda
Attorney, Agent, or Firm—Trexler, Bushnell, Giangiorgi & Blackstone, Ltd.

[57] ABSTRACT

A roller with a doctor blade has both a harder material portion and a softer material portion provided on the peripheral surface in the same radius from the center of the roller, for achieving complete doctoring. The harder material portion forms a minimum belt-like line in a non-perpendicular direction with respect to the axis of the roller, and preventing wear by doctoring against the softer material portion, and limits the wear of the doctor blade, producing uniform wear without a fear of local wear. The softer material portion has maximum area provided between the turns of the belt-like line and facilitates the formation of cells for measuring and the use of a lipophilic material.

21 Claims, 2 Drawing Sheets

LIQUID SUPPLY ROLLER AND METHOD OF MAKING SAME

BACKGROUND OF THE INVENTION

1. Field of the Invention

The present invention relates to a roller suitable for supplying a constant amount of liquid or viscous fluid to a web-fed or sheet-fed plane and a method of manufacturing the roller and, more particularly, to a roller for supplying a constant amount of liquid which is used for, for example, a press when the liquid to be supplied is ink; an offset press when the liquid is dampening water; a printer when the liquid is a dye; a gumming machine when the liquid is paste; and a coating machine when the liquid is coating fluid; and a method of manufacturing the roller. The roller for supplying a constant amount of liquid includes not only a roller for supplying a novel liquid but also a roller for indirectly helping a liquid to be supplied in a constant amount or normally by removing the surplus of the liquid which has once been supplied and returned or non-uniformly distributed portion.

2. Description of the Prior Art

The capacity of a roller for supplying a constant amount of liquid depends on a combination of the roller and a doctor blade for constantly scraping off the surplus of a liquid which has once been supplied, whether the peripheral surface of the roller is even or rough.

For example, when a mesh roller, namely, a roller provided with regular cells on its peripheral surface (the details are described at pp 41 to 45, "New Principle and Practice of Flexographic Press" translated by Japanese Flexographic Technology Association and issued on Mar. 28, 1985), is incorporated into an ink supply system of a press, cells which are the same in size and configuration and are regularly arranged serve as if they were measures, and the surplus ink which adheres to the protrusions is scraped off by a doctor blade, so that only the constant amount of ink within the cells having the same configuration is supplied.

In order to eliminate the non-uniform distribution of the liquid on the roller, there is a phenomenon of the surplus of the ink which has once been supplied to a plate cylinder returning to the ink supply system. To prevent the surplus ink from being mixed with newly supplied ink, the doctor blade is brought into contact with the return side of the peripheral surface of a smooth roller of the ink supply system so as to scrape off the surplus ink or water which returns there (see Japanese Patent Laid-Open No. 44393/1985).

In both cases described above, when oil ink is used, the peripheral surface of a roller of the ink supply system is coated with copper or a copper alloy which has lipophilic nature in order that the peripheral surface of the roller is ready to receive the oil ink. However, since the hardness of copper or a copper alloy is very low while the hardness of the doctor blade composed of carbon tool steel (SK - 5) is very high, if the peripheral surface coated with copper or copper alloy and the doctor blade are brought into contact with each other, the copper layer wears out too much for a long-term service.

In order to solve this problem, Japanese Patent Laid-Open No. 44393/1985 has proposed a method of spraying porous ceramic onto the peripheral surface of the roller so as to hold the hardness of the layer which can withstand the contact of the blade, while filling the pores with a lipophilic resin which readily absorbs oil ink.

In this case, however, since it is very difficult to provide, for example, regular cells on the peripheral surface of the roller which is uniformly coated with ceramic, it cannot disadvantageously be used as a mesh roller (anilox roller).

Furthermore, since the entire peripheral surface is uniformly coated with ceramic, the doctor blade which is constantly in contact with the peripheral surface wears out in a short time, which frequently requires adjustment of the contact state or replacement of the blade, resulting in waste of materials.

Accordingly, a roller which has both hard portion which is capable of limiting the wear of a doctor blade to its minimum and producing uniform wear without a fear of local wear, and soft portion which facilitates the formation of cells for measuring and the use of lipophilic material has been strongly demanded.

SUMMARY OF THE INVENTION

It is an object of the present invention to provide a roller which meets the above-described demand.

To achieve this aim, a roller according to the present invention comprises a continuous belt-like line and/or a discontinuous belt-like line which is composed of a material having high wear resistance and is provided on the peripheral surface of the roller in a non-perpendicular direction with respect to the axis of the roller, namely, obliquely to the axis. In other words, a roller according to the present invention is provided with soft portions and hard portions separately from each other unlike a conventional one having soft portions and hard portions mixed with each other in the same plane.

According to the present invention, since the area occupied by the hard belt-like line is very small with respect to the entire peripheral surface of a roller, not only is it easy to machine or change the greater part of the peripheral surface in accordance with the nature of a liquid or a viscous fluid which is to be supplied in a constant amount, but also it is possible to continue stable supply of necessary and sufficient liquid or viscous fluid.

If the hard belt-like line is provided perpendicularly to the axis of the roller, only one part of the tip of the doctor blade concentratedly wears out, but in the present invention, since the hard belt-like line is obliquely provided in a non-perpendicular direction with respect to the axis of the roller, the positions of the belt-like line at which they come into contact with the tip of the doctor blade constantly change with the rotation of the roller. Therefore, there is not a local wear but a uniform wear of the local blade, which enables the doctor blade to withstand long-term service.

Since the roller rotates in a state in which the tip of the doctor blade is supported by a plurality of turns of the hard belt-like line with an appropriate space therebetween, the soft portions of the peripheral surface which are sandwiched by the turns of the belt-like line are protected from being scratched due to the contact of the doctor blade, so that the durability of the soft portions are greatly enhanced.

The above and other objects, features and advantages of the present invention will become clear from the following description of the preferred embodiments thereof, taken in conjunction with the accompanying drawings

DESCRIPTION OF THE PREFERRED EMBODIMENTS

Figure 1:
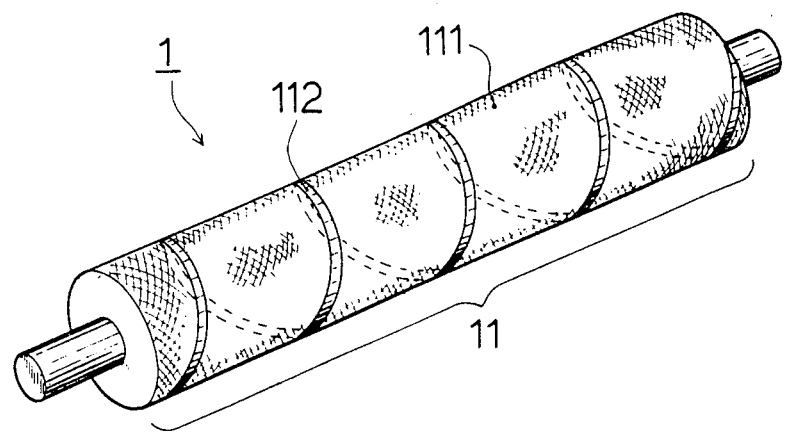
FIG. 1 is a perspective view of a first embodiment of a roller according to the present invention.

Referring first to FIG. 1 which shows a first embodiment of the present invention, a belt-like line 112 which is composed of a material having high wear resistance is spirally provided in the peripheral surface 11 of a roller 1 such that the belt-like line is as high as or slightly higher than the soft portion 111 of the peripheral surface 11.

The peripheral surface 11 may be smooth or be provided with regular gravure cells for supplying a constant amount of material by a known rolling or laser beam machining method prior to the cutting of a groove 112a. When the cells are formed on the belt-like line 112, which is hard, they are preferably formed by laser beam machining. Cells for supplying a constant amount of material may be formed solely on the soft portion 111 of the peripheral surface 11 except for the belt-like line 112.

Figure 6:
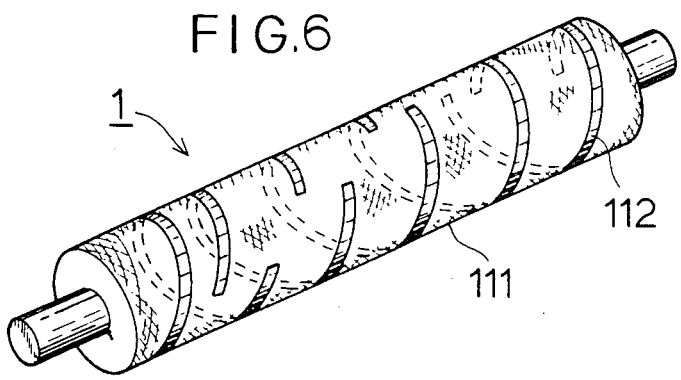
FIG. 6 is a perspective view of a third embodiment of the roller according to the present invention.

The belt-like line 112 is a spiral continuous line in the embodiment shown in FIG. 1, but it is also possible to produce the effect of the present invention when the belt-like line 112 is a discontinuous line consisting of broken lines, dotted lines, or chain lines which are arranged in series or a line consisting of a mixture of these lines. The belt-like line 112 having a configuration of a discontinuous line which is displaced in the axial direction, for example, a discontinuous line consisting of lines one of which terminates at the position of a little over one turn around the peripheral surface of the roller, and another of which begins at a position displaced in the axial direction, as shown in FIG. 6, also brings about the effect of the present invention. Only a single belt-like line may be formed, as shown in FIG. 1, or a plurality of belt-like lines may be formed in parallel to each other.

Figure 3:
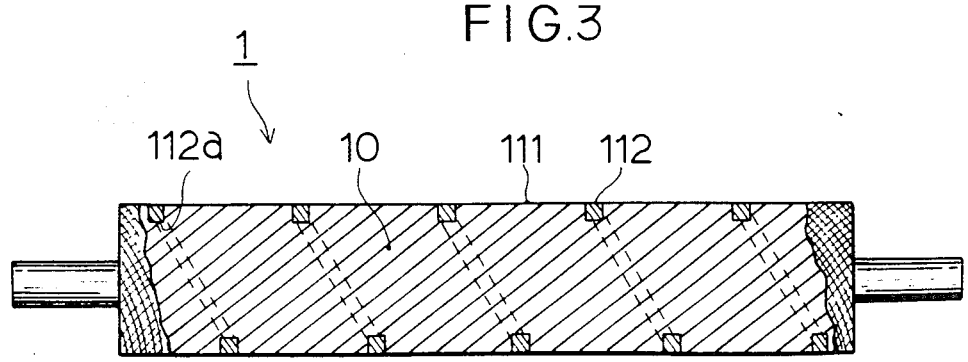
FIG. 3 is a partially sectional view of another example of the first embodiment shown in FIG. 1.
Figure 4:
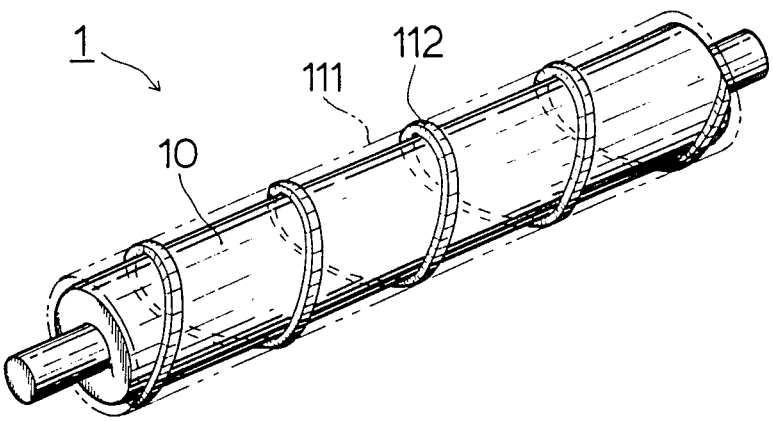
FIG. 4 is a perspective view of still another example of the first embodiment shown in FIG. 1, in the state of being manufactured.

The belt-like line 112 is formed by charging a hard material such as ceramics and tungsten carbide into the groove 112a of a steel base material 10 (see FIGS. 2 and 3) by spraying or the like, or the belt-like line 112 composed of a hard material is protrudingly provided on the base material 10 of the roller 1 in a fixed state by spraying or the like, as shown in FIG. 4, so as to prevent the soft portion 111 of the peripheral surface from being worn by the tip of a doctor blade (not shown).

FIG. 4 also illustrates another method of forming the belt-like line 112. The peripheral surface of the roller except the belt-like line 112 is uniformly cut away so as to make the belt-like line 112 of the steel of the base material 10. In this case, therefore, a material for the soft portion 111 of the peripheral surface is charged into the recesses between the turns of the belt-like line member 112 to such an extent as to conceal the belt-like line by spraying or the like and thereafter the peripheral surface of the belt-like line 112 is exposed to the peripheral surface of the roller.

On the other hand, the soft portion 111 of the peripheral surface may be formed of steel which is the same material as that of the base material 11 of the roller 1, as shown in FIG. 3. In this case, the groove 112a having appropriate width, depth and pitch is first spirally provided on the peripheral surface of the roller, and a material having a higher wear resistance than the steel material is then charged into the groove 112a by spraying or the like, such that the belt-like line 112 is as high as or slightly higher than the soft portion 111 of the peripheral surface.

Figure 2:
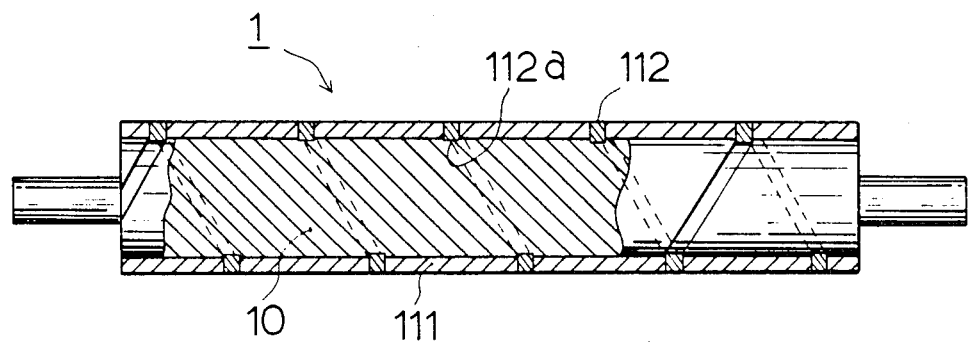
FIG. 2 is a partially sectional view of one example of the first embodiment shown in FIG. 1.

In the embodiments shown in FIGS. 2 and 4, it is possible to select a material for the soft portion 111 of the peripheral surface comparatively freely.

In a press, for example, when a material to be supplied is ink, the material having the affinity for ink is different depending on whether the nature of ink is oily or aqueous. When ink is aqueous, a material having high hydrophilic nature such as chromium is suitable, while when it is oily, a material having high lipophilic nature such as copper or a copper alloy is suitable.

Figure 5:
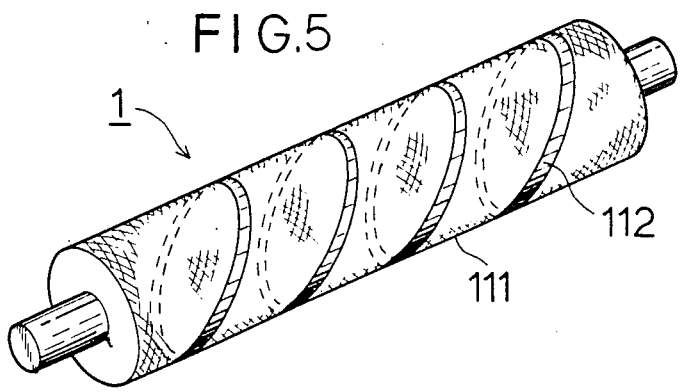
FIG. 5 is a perspective view of a second embodiment of the roller according to the present invention.

FIG. 5 shows an embodiment of a roller 11 provided with belt-like lines 112 each of which consists of a loop which is non-perpendicular with respect to the axis of the roller 1. Strictly speaking, an oblique loop has two points per turn at which the loop is perpendicular to the axis. However, since the contact between those points and the doctor blade lasts only a moment during high-speed rotation and the contact point immediately displaces, the local wear of the tip of the blade caused thereby is very slight.

In the embodiment shown in FIG. 5, the direction in which the loops are inclined is limited to one direction, but the object of the present invention is also achieved by inclining the loops to both right and left directions (not shown) or forming a spiral zigzag belt-like line (not shown), because a greater part of the belt-like line is non-perpendicular to the axis of the roller 1, thereby preventing local wear of the tip of the blade (not shown).

The roller 1 of the present invention not only is used for an ink supply system of a press but also can find wide applications in industrial machines such as a dampening supply system of an offset press, a printer, a gumming machine, and various coating machines.

As described above, a conventional roller in which soft and hard materials are mixed with each other is disadvantageous in that it is difficult to machine the peripheral surface and in that the blade wears in a short time. The present invention has developed a system of obliquely providing a hard line for separating the soft portions from hard portions to eliminate these defects. Since the continuous and/or discontinuous belt-like line 112 composed of a material having high wear resistance is provided on the peripheral surface 11 of the roller 1 in a non-perpendicular direction with respect to the axis of the roller, the hard portions occupy the necessary minimum area on the peripheral surface and are concentratedly provided with an appropriate space between the portions, while it is possible to provide the pure soft portion 111 of the peripheral surface at the largest possible area. Accordingly, it is easy to machine the peripheral surface, for example, to form cells for supplying a constant amount of material, thereby ensuring continuous stable supply of a constant amount of material. In addition, since the soft portion 111 of the peripheral surface is protected from wearing due to the contact with the blade by the minimum hard belt-like line 112. Furthermore, since the belt-like line 112 is provided in a non-perpendicular direction with respect to the axis of the roller, the tip of the blade uniformly wears out without local wear. Thus, the doctor blade economically advantageously withstands long-term service and requires replacement less frequently.

The present invention has wide applications in rollers which are combined doctor blades.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A roller comprising a harder material portion and a softer material portion exposed on the peripheral surface of said roller at the same radius from the center of the roller; said harder material portion forming a continuous and/or a discontinuous belt-like line provided in a non-perpendicular direction with respect to the axis of said roller; and said softer material portion provided between turns formed in said belt-like line.

2. A roller according to claim 1, wherein said belt-like line is a spiral line.

3. A roller according to claim 2, wherein said belt-like line is a zigzag spiral line.

4. A roller according to claim 1, wherein said belt-like line consists of loops.

5. A roller according to claim 4, wherein said belt-like line consists of loops which are arranged in a zigzag line.

6. A roller according to claim 1, wherein said peripheral surface of said roller except said belt-like line is composed of a material having high lipophilic nature.

7. A roller according to claim 6, wherein said material having high lipophilic nature is copper or a copper alloy.

8. A roller according to claim 1, wherein said pepherial surface of said roller except said belt-like line is composed of a material having high hydrophilic nature.

9. A roller according to claim 8, wherein said material having high hydrophilic nature is chromium.

10. A roller according to claim 1, wherein said peripheral surface of said roller except said belt-like line is composed of the same material as that of the base material of said roller.

11. A roller according to claim 1, wherein said material which constitutes said belt-like line is a ceramic.

12. A roller according to claim 1, wherein said material which constitutes said belt-like line is tungsten carbide.

13. The roller according to claim 1 wherein said exposed surface of said softer material portion is larger in area than the area of said exposed surface of said belt-like line of said harder material portion.

14. The roller according to claim 1 in combination with a doctor blade engageable against both said exposed harder and softer material portions of said roller.

15. A roller according to claim 1, wherein said peripheral surface of said roller except said belt-like line is provided with a multiplicity of regular cells for measuring.

16. A roller according to claim 1, wherein said peripheral surface of said roller including said belt-like line is provided with a multiplicity of regular cells for measuring.

17. A roller according to claim 1, wherein said peripheral surface of said roller including said belt-like line is smooth.

18. A method of manufacturing a roller comprising the steps of:
cutting a continuous groove and/or a discontinuous groove on the peripheral surface of said roller in a non-perpendicular direction with respect to the axis of said roller;
forming a belt-like line by charging a harder material than the material of said peripheral surface of said roller into said groove, and
finishing both peripheral surfaces of said belt-like line and the uncut roller surface so taht said respective finished surfaces are exposed at the same radius from the center of said roller.

19. A method of manufacturing a roller comprising the steps of:
forming regular cells on the peripheral surface of said roller;
cutting a continuous groove and/or a discontinuous groove on the peripheral surface of said roller in a non-perpendicular direction with respect to the axis of said roller;
forming a belt-like line by charging a harder material than the material of said peripheral surface of said roller into said groove, and
finishing both peripheral surfaces of said belt-like line and the uncut roller surface so that said respective finished surfaces are exposed at the same radius from the center of said roller.

20. A method of manufacturing a roller comprising the steps of: protrudingly providing a continuous line and/or discontinuous line in a fixed state which is composed of a material having high wear resistance on the peripheral surface of said roller in a non-perpendicular direction with respect to the axis of said roller;
charging a softer material than said material into the peripheral surface portions between the turns of said belt-like line, and
finishing both peripheral surfaces of said belt-like line and said softer material so that said respective finished surfaces are exposed at the same radius from the center of said roller.

21. A method of manufacturing a roller comprising the step of:
uniformly cutting away the peripheral surface of said roller except portions which constitute a continuous line and/or a discontinuous line of the same material as that of a base material of said roller;
charging a softer material than said base material into the recesses between turns of said belt-like line formed by cutting said peripheral surface to such an extent as to conceal said belt-like line; and
finishing both peripheral surfaces of said belt-like line and said softer material so that said rspective finished surfaces are exposed at the same radius form the center of said roller.

* * * * *